United States Patent [19]

Markson et al.

[11] Patent Number: 4,996,473
[45] Date of Patent: Feb. 26, 1991

[54] MICROBURST/WINDSHEAR WARNING SYSTEM

[75] Inventors: Ralph J. Markson, Weston, Mass.; Bruce E. Anderson, Londonberry, N.H.

[73] Assignee: Airborne Research Associates, Inc., Weston, Mass.

[21] Appl. No.: 353,390

[22] Filed: May 17, 1989

Related U.S. Application Data

[63] Continuation-in-part of Ser. No. 244,092, Sep. 14, 1988, abandoned, and a continuation-in-part of Ser. No. 116,482, Nov. 2, 1987, Pat. No. 4,901,564, said Ser. No. 244,092, is a continuation of Ser. No. 897,214, Aug. 18, 1986, Pat. No. 4,801,942.

[51] Int. Cl.$^5$ .................. G01W 1/00; G01W 31/02
[52] U.S. Cl. ............................ 324/72; 342/460; 340/601
[58] Field of Search ............. 342/460, 387, 463; 73/170 R; 340/601; 324/72

[56] References Cited

U.S. PATENT DOCUMENTS

| | | |
|---|---|---|
| 3,215,997 | 11/1965 | Leavitt et al. |
| 3,369,240 | 2/1968 | Leary |
| 3,670,332 | 6/1972 | Blommendaal |
| 3,727,225 | 4/1973 | Adrian |
| 3,754,263 | 8/1973 | Wojtasinski et al. |
| 3,790,884 | 2/1974 | Kohl |
| 3,886,554 | 5/1975 | Braun et al. |
| 3,973,258 | 8/1976 | Cerni et al. |
| 4,023,408 | 5/1977 | Ryan et al. |
| 4,115,732 | 9/1978 | Krider et al. |
| 4,198,599 | 4/1980 | Krider et al. |
| 4,215,345 | 7/1980 | MacDoran |
| 4,245,190 | 1/1981 | Krider et al. |
| 4,395,906 | 8/1983 | Ryan et al. |
| 4,422,037 | 12/1983 | Coleman |
| 4,424,481 | 1/1984 | Laroche et al. |
| 4,506,211 | 3/1985 | Coleman |
| 4,543,580 | 9/1985 | Bent et al. |
| 4,594,543 | 6/1986 | Eriksson et al. |
| 4,672,305 | 6/1987 | Coleman |
| 4,684,951 | 8/1987 | Baumer |
| 4,746,924 | 5/1988 | Lightfoot |
| 4,792,806 | 12/1988 | Bent et al. |
| 4,803,421 | 2/1989 | Ostrander |
| 4,806,851 | 2/1989 | Krider et al. |
| 4,841,304 | 6/1989 | Richard et al. |
| 4,914,444 | 4/1990 | Pifer et al. |
| 4,916,455 | 1/1990 | Bent et al. |

OTHER PUBLICATIONS

E. W. Coleman, "LSZ-850 Lightning Sensor System", *Proceedings of the 1988 International Aerospace and Ground Conference on Lightning and Static Electricity*, Oklahoma City, Apr. 19-22, 1989, NOAA special report, pp. 434-438.

J. M. McClellan, "Stormbusters," *Flying*, pp. 64-68, (Mar. 1987).

J. W. Warwick, C. O. Hayenga and J. W. Brosnahan, "Interferometric Directions of Lightning Sources at 34 MHz", *Journal of Geophysical Research*, vol. 84, No. C5, pp. 2457-2467 (1979).

C. O. Hayenga and J. W. Warwick, "Two-Dimensional Interferometric Positions of UHF Lightning Sources," *Journal of Geophysical Research*, vol. 86, No. C8, pp. 7451-7462 (1981).

C. B. Moore and B. Vonnegut, "The Thundercloud", Chpt. 3, in Lightning, vol. 1, *Physics of Lightning*, R. H. Golde Editor, Academic Press, London, (1977) pp. 63-65 and 80-83.

(List continued on next page.)

*Primary Examiner*—Gerard R. Strecker
*Assistant Examiner*—Jose M. Solis
*Attorney, Agent, or Firm*—Fish & Richardson

[57] ABSTRACT

A system for predicting the occurence of microburst-/windshear comprising at least one sensor for receiving lightning produced signals, a processor for processing those received signals to produce data and generate a warning when the processed data indicates that a microburst/windshear is about to occur.

18 Claims, 4 Drawing Sheets

OTHER PUBLICATIONS

E. R. Williams and R. E. Orville, "Intracloud Lightning as a Precursor to Thunderstorm Microbursts," *Proceedings 1988 International Aerospace and Ground Conference on Lightning and Static Electricity*, pp. 451–459.

M. Weber and E. R. Williams, "Rapid Update Doppler Radar and Electrical Measurements of a Microburst Producing Thunderstorm," Abstract A41B-08 EOS (Transactions Amer. Geophys. Union) p. 1227, (Nov. 3, 1987).

E. R. Williams et al., A Lightning Precursor to Microbursts in Thunderstorm, Abstract A41B-09, EOS (Trans. Amer. Geophys. Union), p. 1227, (Nov. 3, 1987).

MICROBURST/WINDSHEAR WARNING SYSTEM

This application is a continuation-in-part of co-pending application Ser. No. 244,092, filed Sept. 14, 1988, now abandoned, which was a continuation of application Ser. No. 06/897,214, filed Aug. 18, 1986, now issued as U.S. Pat. No. 4,801,942, on Jan. 31, 1989; is a continuation-in-part of co-pending application Ser. No. 116,482, filed Nov. 2, 1987 and now issued as U.S. Pat. No. 4,901,564 on Feb 20, 1990.

BACKGROUND

This invention relates to the prediction of microbursts and windshear which can accompany thunderstorms.

One of the more spectacular of atmospheric events is a thunderstorm. In a thundercloud, charges become separated until the potential difference within the cloud or between the cloud and ground exceeds 100 million volts. When the potentials become that high for cloud-to-ground lighting (CG), a relatively low current discharge occurs, called a leader. The leader ionizes a small irregular path of air in a series of rapid steps. The leader provides the higher conductivity path that the return stroke, the luminous upward traveling discharge from the earth usually perceived as lightning, will travel during a discharge.

Each CG lightning flash may actually be composed of several strokes. Each stroke results in a peak current flow of typically more than 20,000 amps. The passage of this amount of current fully ionizes the air in the lightning channel and results in the production of light and radio frequency (RF) electromagnetic waves. The RF radiation produced in a storm is both vertically and horizontally polarized and has a wide-band frequency distribution.

Not all lightning occurs between earth and ground. The majority of lightning is intra cloud (IC) or between clouds. Interferometric measurements have shown that the majority of discharges take place within a cloud. These discharges are characterized by a pattern of hundreds of RF point sources which propagate horizontally within the cloud and only infrequently turn toward earth to become cloud to ground discharges. A proportionately larger fraction of the energy in RF emissions from IC discharges is in the high, very high (VHF) and ultra high (UHF) frequencies while more of the energy in CG discharges is in the low (LF) and very low (VLF) frequencies.

Although the mechanism by which electric charges are separated in a thundercloud is not completely understood, it is known that the charge separation is accompanied by vertical movements of air. During the initial formation of the thundercloud there is an upward movement of the air mass, an updraft, from the lower part to the upper part of the developing cloud.

The updraft is presumed to contribute to the separation of charge by carrying charged ice particles into the updraft region. These ice particles absorb moisture from the air and grow until they are too heavy to be supported. When that happens, they begin to fall, and continue to grow by sweeping smaller particles from the air column.

As the larger particles fall, they entrain nearby air into a downdraft, which pulls dryer air from outside the falling air column into the column. The dry air causes the ice particles to sublimate, which results in the cooling of the falling air column. As the air cools, it becomes denser and falls faster. A considerable mass of solid and liquid water also may be in the downdraft.

If the falling column of air passes through the 0° C. isotherm toward warmer temperature, the ice particles will melt. The phase change from ice to water will further cool the air, resulting in the additional loss of buoyancy. This loss further increases the air column's downward acceleration. This downward moving column of air, typically 0.4-4 km in diameter and moving in excess of 3-4 m/sec, is called a microburst.

When the microburst approaches the ground, the column of air is deflected and moves along the earth s surface. This can be similar to the way water from a hose sprays radially when the hose is pointed at the ground. Because of this divergence of the air column near the ground, the direction of the air flow near the ground level will appear to vary as one moves vertically over a relatively short distance. This abrupt change in wind velocity with altitude is called windshear.

Both microbursts and windshear are of more than academic interest because of the dangers they pose to aircraft. If an aircraft, taking off or landing, passes into a microburst, it is exposed to a downward acceleration at a time when there may be insufficient altitude for the pilot to avoid crashing.

Windshear poses a similar hazard. The lift provided by an aircraft wing is determined by the velocity of air passing across the wing, i.e., the relative velocity of the aircraft through the air. If the relative velocity decreases past a critical value, the air begins to separate from the wing surface and the aircraft loses the lift necessary to remain airborne. This loss of lift is termed stalling. An aircraft which is taking off or landing is operating just above the velocity at which it stalls. If the wind velocity relative to the ground suddenly decreases or reverses direction, the aircraft may find that its relative airspeed, which was greater than its stall velocity, is now below its stall velocity, and that it has insufficient lift to remain airborne.

This can happen when an aircraft takes off or lands within a region of wind shear. For example, although the wind velocity may initially be such that the relative airspeed is greater than the stall speed of the aircraft, just a short vertical distance away, the aircraft may move into a region where the wind direction reverses, causing the wind speed over the wing to fall below stall velocity. Since this usually happens near the ground, the pilot may not be able to increase the speed of the aircraft quickly enough to regain lift before the aircraft loses what little altitude it has.

Particularly susceptible to these problems are the large jet aircraft used by the airline industry. Because these airplanes are so large, and because a jet engine requires a substantial amount of time to build up trust, a pilot may not be able to accelerate the airplane quickly enough to avoid crashing if the plane stalls because of windshear or is forced downward because of microburst downdrafts and mass loading of the airframe by rain. Over the last few years several airline disasters have been attributed to windshear and microbursts.

Several systems have been invented to alert ground personnel of the existence of potentially dangerous wind variations that would be hazardous to aircrafts which are landing or taking off. One of the systems consists of a two dimensional horizontal array of wind direction and velocity indicators located on the ground at an airport. When a microburst occurs, different sensors in the array indicate a different wind direction and speed at the same time. Although it is possible to infer windshear with this system, only a relatively small region can be monitored. Further, the system can only indicate that a microburst is occurring and can not predict when or where microbursts or windshear will occur.

In an effort to increase the size of the region monitored for windshear and expand coverage into the third dimension (height), Doppler radar is used. Doppler radar measures the velocity component of particles of dust or rain in the direction toward or away from the radar antenna. The principle is that under windshear, a small region of space will appear to have particles moving toward or away from the antenna at different velocities as a function of height. Unfortunately, nothing of the particles moving perpendicular to the radar beam can be determined. Therefore, microburst downdrafts cannot be measured by Doppler radar scanning close to the horizontal plane, which is its normal mode of operation. Doppler radar will detect microbursts only if the radar antenna is pointed above the horizontal so that the downward motion becomes a sufficiently large radial component relative to the antenna. Doppler radar can also detect windshear after the microburst air turns horizontal near the ground. However, if there are no particles, such as when the rain evaporated below cloudbase in the "dry" thunderstorms in clean air which occur in parts of the country, there may be no windshear detected. Again, Doppler radar is mostly useful as an indicator of the presence of windshear, and not as a predictor of its occurrence.

Other devices have been developed to make use of the electrical discharge which occurs to detect the presence of thunderstorm activity. The devices do not measure microburst/windshear and windshear directly but simply warn of the presence of thunderstorms and therefore the possibility of windshear. U.S. Pat. No. 4,023,408 discloses a device which measures the direction to CG and IC discharges and estimates their distance by determining the intensity of the strength of the RF signals generated by the discharges. The assumption is made that the higher the signal strength, the closer the discharge. This device has inherent inaccuracy because it will regard a weak discharge as being further away than a strong discharge at the same distance.

Another device (U.S. Pat. No. 4,672,305) measures the ratio of the electric to magnetic field of the discharge to determining the distance to the discharge if the discharge is within 20 nautical miles, and the ratio of the magnetic fields at two frequencies if the discharge is greater than 20 nautical miles from the receiver. Again this device can only estimate the distance of the lightning flash. Both these lightning mapping systems detect IC discharges, but because of the elongated nature of the radiator, and variable polarization and intensity of the discharges, they cannot resolve the position of the discharge with much accuracy (many miles or tens of miles,-much coarser than the 0.5-2 mile scale of the thunderstorm up and down-drafts).

Lightning interferometers are capable of resolving the IC lightning discharge into a series of radiators. Such devices allow the electrical discharge within the cloud to be mapped with high spatial (0.1 mile) and temporal (msec) resolution and a detailed description of the lightning discharge to be obtained.

None of these devices actually measures or predicts microburst/windshear. The present invention provides a warning to a high degree of certainty that a microburst/windshear is about to occur and its location, allowing pilots ample time to make an appropriate response.

SUMMARY OF THE INVENTION

The invention disclosed herein involves a system of predicting microburst/windshear based upon the reception of the signals generated by lightning. A plurality of sensors monitor the VLF, VHF, UHF or visible bands of the spectrum, and relay the data to a processor which calculates the location of the lightning, the frequency of the discharges, the rate of increase in the frequency of discharge, and the aerial density of the discharges. When the lighting rate and the rate of change of the lightning rate exceed given threshold levels for a given area and there is a peak in the lightning rate, a microburst/windshear is imminent in that area.

The present invention provides the capability of predicting with near certainty the occurence of a microburst/windshear from the signals from a thundercloud and not simply reporting that a burst is occurring.

BRIEF DESCRIPTION OF THE DRAWING

The drawing is briefly described as follows.

DESCRIPTION OF THE PREFERRED EMBODIMENTS

Figure 1:
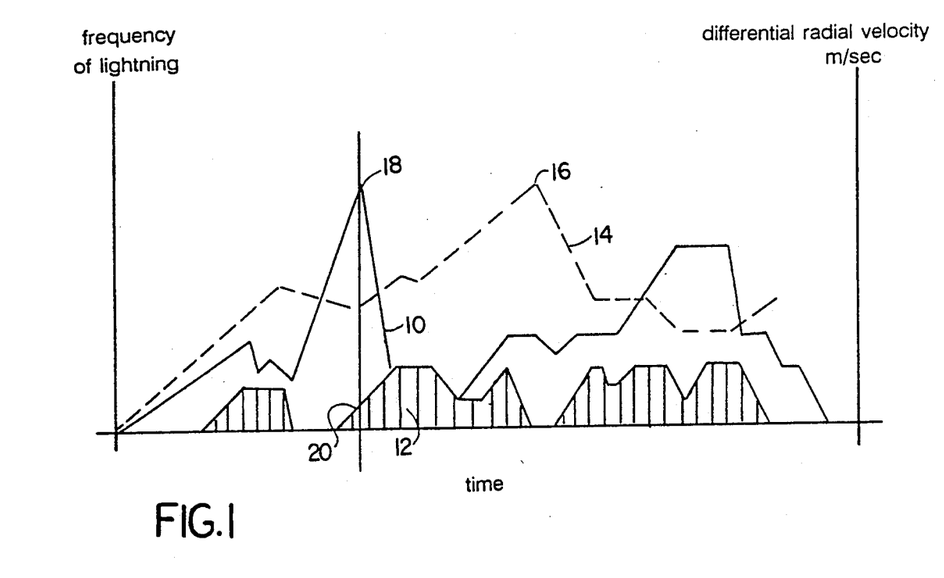
FIG. 1 is a graph indicating the relationship between horizontal wind outflow as an indicator of microburst/windshear, total lightning, and intra cloud lightning.

FIG. 1 graphically illustrates the relationship between total lightning freguency (shown as a solid line) 10, cloud-to-ground lightning freguency (shown in cross-hatch) 12, and differential radial air mass velocity 14 (shown as a broken line) which is associated with microburst/windshear activity. (Intracloud Lightning As A Precursor To Thunderstorm Microbursts - E. R. Williams, and R. E. Orville, Proc. 1988 Int. Aerospace and Ground Conf. on Lightning and Static Electricity, 1988, pp. 454-459). As can be seen from this graph, the microburst/windshear, as detected by the peak radial velocity 16 followed immediately after a dramatic increase of IC discharges as shown by the peak in the total lightning frequency 18 and no increase in the CG lightning frequency 20. It can be inferred that the IC lightning activity is a more accurate prediction of microburst/windshear formation than is the CG activity or total discharge activity. To predict microburst/windshear, it is necessary to measure the lightning rate and location and indicate that microburst/windshear is imminent and signal an alarm when the lightning rate and its time derivative reaches a given threshold within a region of limited area followed by a decrease in the rate time derivative in that limited area indicating a peak in the lightning rate.

Figure 2:
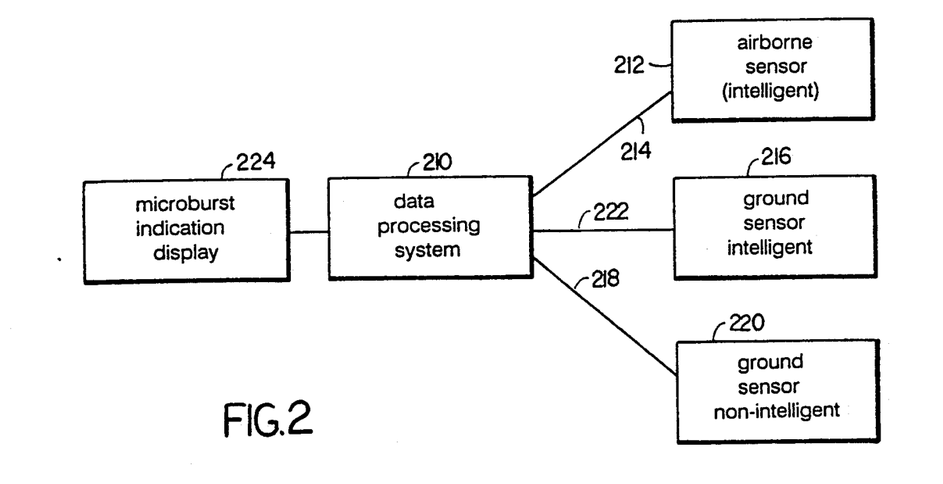
FIG. 2 is a block diagram of generalized embodiment of the invention.

A system for predicting microburst/windshear is shown in FIG. 2. A data processing system 210 collects data from a series of sensors 212, 216, and 220 which either have local processing capabilities 212, 216 and transmit to the central data processing system analyzed-data concerning the frequency of discharges and the location of the storm, or do not have local processing capabilities 220 and which transmit to the processor 210 raw information concerning the detection of a discharge and its location. If the sensors are airborne 212 it is possible either to transmit this data over radio links dedicated to such data collection or using the transponder down-link 214 which is currently used by aircraft to communicate aircraft data to the ground. Ground based sensors 216, 220 can either communicate over dedicated lines 218 or through radio, microwave, optical or laser links 222.

Once the microburst/windshear has been predicted, the predicted time and location can then be broadcast. Receivers of the broadcast can then display the information either directly as received or in conjunction with the receiver's location information. Such a display may be graphical showing the relative positions of the predicted microburst/windshear and the receiving station, as they change with time.

Although in FIG. 2, the sensors are shown separated from the processor, being either airborne or if on the ground being physically distant from the processor, it is possible to have a self contained system with the sensors being in close proximity to the processor, for example, on an aircraft. What is required is that the sensors provide all the distance and direction information for each flash without resort to information from other distant sensors. An example of such a sensor arrangement will be given below. Such a self contained system can further be in communication with a distant central processor to disseminate the information and thereby act as a preprocessor.

Figure 3:
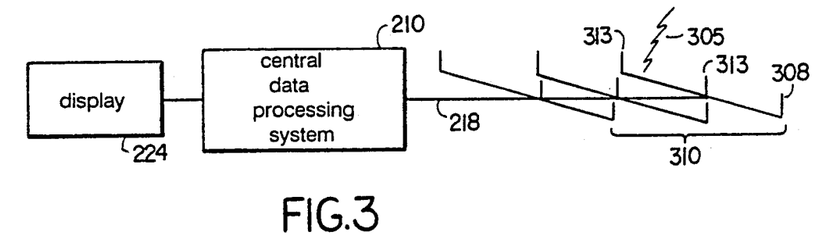
FIG. 3 is a block diagram of an embodiment of the invention using an array of electrostatic sensors on the ground.

Considering each of the system components separately, many types of sensors are suitable for use in this system. An example of an array of sensors which can be used with this system are shown in FIG. 3. The data processing system 210 is connected to sensor array 310 through communications links 218. The sensor array 310 is a two-dimensional array of electrostatic potential (e.g. corona point) detectors 308 as are described in a co-pending patent application, Ser. No. 281,842 filed Dec. 8, 1988 herein incorporated by reference. Each detector 308 measures the time, amplitude, and sign of the fluctuations in the electrostatic potential and reports these measurements to the central data processing system 210. Lightning discharges manifest themselves as a discontinuity in the electrostatic potential. From this data the data processing system 210 can determine the frequency of discharge. Additionally, since the detector closest 313 to the discharge 305 will experience the strongest signal, the approximate location of the discharge can be determined. Further, by analyzing the signals from all the detectors in the array in terms of a matrix model, increased accuracy can be obtained.

The use of such an array with a preprocessor useful in predicting microburst/windshear is described in co-pending patent application Ser. No. 116,482 filed Nov. 2, 1987, now U.S. Pat. No. 4,901,564.

This array with local processor described in this co-pending patent application is then linked to the central data processing unit 210 to provide data concerning the location of the predicted microburst/windshear. To improve the accuracy of microburst/windshear prediction one can distinquish the rate of discharge for IC lightning flashes from CG lightning. This can be done simply by measuring the ratio of VHF/UHF to VLF energy or even the ratio of 100 KHz to 5 KHz energy which is much larger for IC discharges. The use of VHF/UHF emissions also allows the individual segments of the IC lightning to be resolved. There are other ways to separate IC from CG lightning eg (a) at distances greater than about 5 miles (the reversal distances) CG discharges which generally lower negative charge to ground can be determined by the sign of the electric field variation, (b) the shape of the field change and r.f. pulse rate can also provide information useful in separating CG from IC flashes. The microsecond resolution of interferometers or time of arrival systems makes possible resolution of much less than 1 km, the scale of microburst/windshear. This is in contrast to the use of VLF RF detection systems which do not provide spatial resolution within a stroke. Such a system resolves a single flash, which can propagate many km horizontally, as a single radiator. VLF detection therefore can not determine a location along an IC discharge as being the source of the radiation. Also, because of polarization errors inherent in VLF systems, it is more likely that the indicated locations will not be close to the actual lightning path. Thus VLF systems generally will not locate the initial source of the IC radiation. The high electric field region is where the charge is separated within the updraft phase the region we wish to identify.

Figure 4:
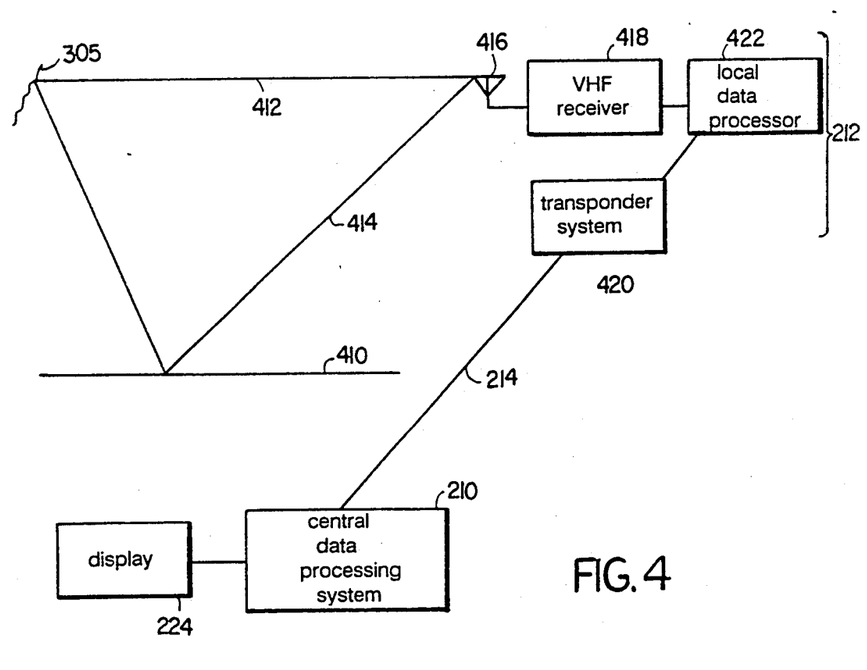
FIG. 4 is a block diagram of an embodiment of the invention with airborne VHF or UHF receivers and a transponder downlink.

The VHF/UHF sensors may be located on the ground or in an aircraft. An example of an VHF/UHF airborne system 212 is shown in FIG. 4. A VHF or UHF receiver 418 receives VHF or UHF signals from a lightning discharge 305, through a directional antenna 416 e.g., crossed-loop. The directional antenna 416 provides the direction information, while the difference in the arrival times of the signal traveling from the discharge 305 to the antenna 416 directly by path 412 and that traveling from the discharge 305 to the antenna 416 after reflecting 414 from the ground 410 provides the distance information. The difference in time-of-arrival in separate antenna on aircraft, instead of a directional antenna, can also be used to determine the lightning bearing from the aircraft. Similarly, an interferometer could be used to determine the bearing angle. The technique of using the time delay between direct and reflected signals to obtain range information is the subject of a U.S. Pat. No. 4,801,940 and a co-pending continuation-in part U.S. patent application, Ser. No. 244,092, filed Sept. 14, 1988, now abandoned both of which are herein incorporated by reference. By using the range determination technique and a bearing determining device, the sensor and processor on an aircraft or the ground have enough information to be self contained, and provide a warning of the impending microburst/windshear without communicating with other systems.

The direction and distance information from the VHF or UHF receiver can be processed by a local data processor 422 prior to being incorporated in the information being transmitted 214 by the aircraft's transponder 420. This information is received by the central data processing system 210 which then, knowing the position of the storm relative to the aircraft and knowing the position of the aircraft relative to the central data processing system's ground location can determine the location and frequency of lightning discharges relative to it's ground location. The aircraft's location relative to the ground can either be determined by using ground radar or by receiving the aircraft's own navigation (e.g. loran) and altitude information. Although it is not necessary to use the aircraft s transponder to transmit the data to the ground, the advantage of using a transponder is that this communications channel already is in operation on all commercial and many non commercial flights. The use of routing commercial flights to gather data has the advantage that the large number of commercial flights makes it possible to predict microburst/windshear and thunderstorm activity over a large portion of the country, particularly near airports where aircraft density maximizes and microburst/windshear is a problem. The transponder system uplink can also be used to send the microburst/windshear to the aircraft.

Figure 5:
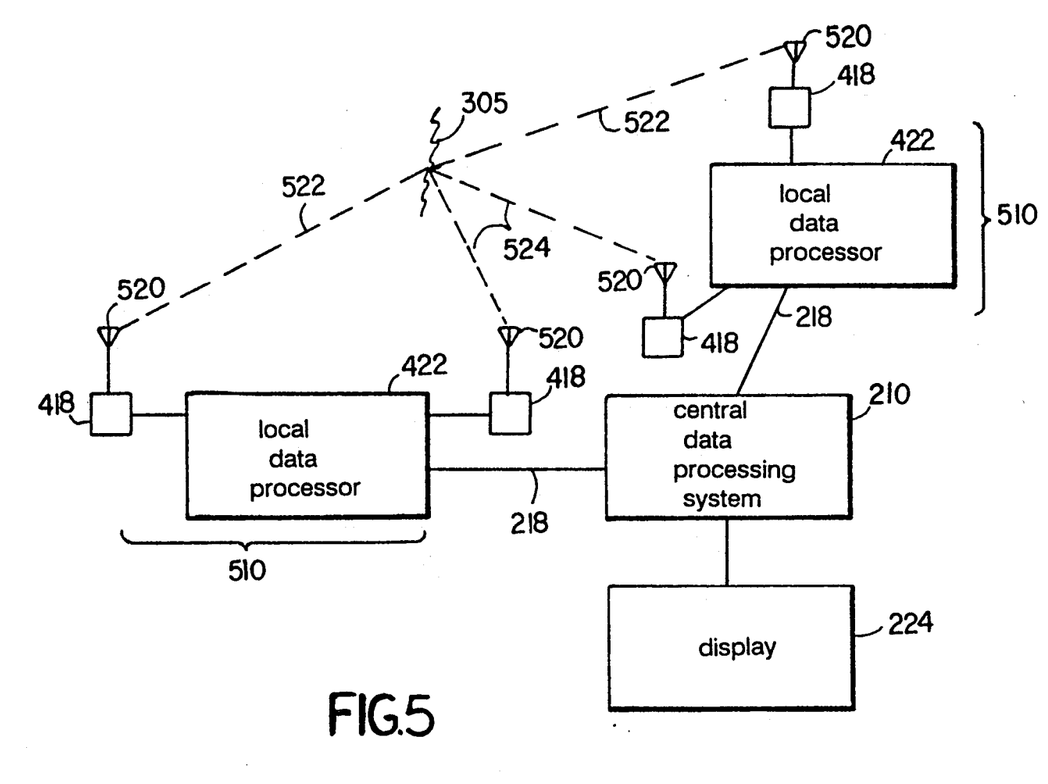
FIG. 5 is a block diagram of an embodiment of an invention using lightning interferometer.

Another embodiment of the invention is shown in FIG. 5. In this embodiment a ground based lightning interferometer 510, consisting of at least two VHF or UHF receivers 418 and antennas 520, separated by a distance, receive radiation from a lightning discharge 305 by two paths 522 and 524. The difference in the path lengths 522 and 524 generates an interference pattern when the signals are combined in a local data processor 422. From the interference information, the direction to the discharge can be determined. In conjunction with a second separated interferometer providing a second direction, location can be determined. This information is then transmitted to the central data processing system 210 over the communications link 212. This system is capable of resolving the location of each segment of IC lightning and thereby provide very accurate location information.

Once the sensors have collected and transmitted the information, the next component of the system, the data processor, receives the data and performs a series of calculations. The purpose of the calculations is to locate and quantify the density of discharges within a given region, determining the time rate of change of activity within the same region, and predict the future course of the activity region.

Specifically, the region of concern is the updraft in a thundercloud cell which is likely to produce a microburst/windshear and whose radius extends to a distance equal to the radius of a typical convective cell (approximately 2 km radius) plus a distance equal to the uncertainty in the location of the lightning (i.e. the inherent accuracy of the detectors). Thus, the region is a circle, a center of activity (COA), centered on the centroid of lightning within the defined radius (e.g., 2 km). The center of activity is translated by the windfield and so will change position with time. Within this COA the number of discharges per unit time, e.g., for the previous minute, is calculated. The time rate of increase in the flash rate is also calculated. When the flash rate exceeds a locally defined threshold value; the increase in lightning rate exceeds a locally defined threshold value and a peak in the lightning rate is detected, all within a given COA, an alarm is given indicating that microburst/windshear is about to occur within that center of activity.

Figure 6:
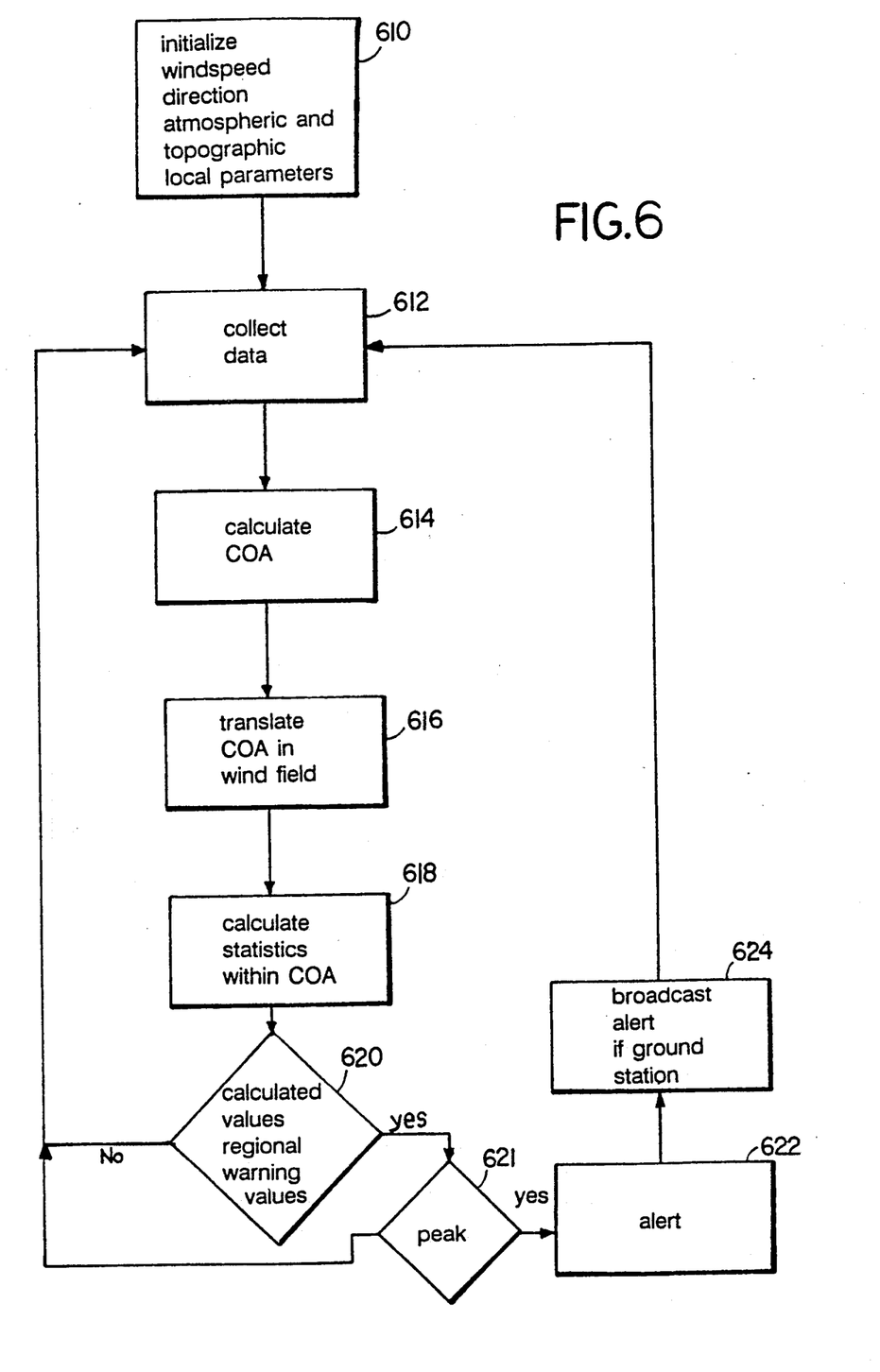
FIG. 6 is a flow chart of an algorithm used to predict microbursts/windshear.

FIG. 6 is a flow chart of the algorithm for performing this calculation. Overall, the algorithm collects data from a sensor, and if the sensor has detected lightning, the algorithm calculates the position of the lightning, the flash rate and the aerial density. Then, depending upon the results of those calculations, the algorithm evaluates the threat and produces a microburst/windshear warning.

In order to predict the future course of the COA, the windspeed and direction are needed. Typically, these values are available for the $-20°$ C. isotherm from aircraft weather services and their values must be periodically updated. During the initialization of the algorithm, the windspeed and direction values are entered 610. The locally defined flash rate and flash rate increase warning values are also entered. More about setting the locally defined flash rate and rate increase will be said shortly.

The wind vector at this temperature level is used as representative of the windfield in which the updraft is embedded. It should be noted that it is possible that the wind vector at another temperature level may be a better indicator of the motion of the updraft at a given geographic location, for a given season or a given thunderstorm type. The temperature level which is most representative of the updraft horizontal motion can be determined by noting the correlation of the movement of the COA's with the wind vector at various temperature levels.

The processor then begins data collection noting the frequency and location of the lightning flashes. There are many ways to calculate the flash number density. For example one can simply defining a grid over the local area and count the number of flashes occurring in a grid location. Alternatively, one can attempt to group the flashes within the confines of various centers of activity. In doing this, a lightning centroid is calculated defining the center of each group of lightning flashes. As the storm develops, the centroids become more defined 614 as additional lightning strokes occur and become more numerous as additional centers of activity develop. As more lightning data is accumulated within a given center of activity, the centroid s position for that center of activity is continually recalculated 616, taking into account that the center of activity of the storm and hence the centroid is being moved by the windfield.

At each instant of time, the flash rate is calculated for each COA and the rate of increase of the flash rate for that COA is also calculated 618. The flash rate and flash rate increase values are compared 620 to the locally defined flash rate and flash rate increase warning values and if these locally defined values are exceeded, a microburst/windshear warning 622 is given once a temporal local maximum (peak) in the flash rate is detected 621. This warning indicates that within a certain number of minutes (determined for each locality), a microburst/windshear will occur within that COA. Again the position of the COA and hence the microburst/windshear must be adjusted for the translation of the COA by the windfield during this defined period.

There is no simple way of determining the local flash rate and flash rate-increase warning values. The values are determined in part by the local climate conditions, so, for example, the values will differ in Denver, Colo. where "dry thunderstorms" with little or no rain can occur, and Huntsville, Ala. where the thunderstorms are accompanied by heavy rain.

To determine these local values, microburst/windshear measurements (e.g. differential radial velocity) using doppler radar or another indicator of microburst/windshear must be plotted along with measurements of electrical activity (e.g. flash rate) of the storm (see FIG. 1). Such measurements of electrical activity, for example, are provided by the various lightning networks in place throughout the country. Again, if CG and IC lightning can be distinguished it is possible to improve the accuracy of the prediction by using the IC electrical activity as the predictor of microburst/windshear activity. From the time difference peaks in the differential velocity and electrical activity curves, the time between the peak in the lightning activity and the onset of a microburst/windshear can be determined for a given location. Next, by noting the size of the values of the peaks in flash rate which do not result in the formation of a microburst/windshear, the threshold limit on the flash rate can be set. Similarly, by determining the value of the derivative of the rate of lightning which also does not result in microburst/windshear production, the threshold limit on the rate of increase in the lightning rate necessary for the formation of microburst/windshear can be determined. For example, for Denver, Colo., the time between a peak in the lightning rate and the onset of a microburst/windshear is on the order of 5 minutes. The threshold values of the lightning rate and the increase in lightning rate which must preceed a peak in the lightning rate for a microburst to occur are 2 flashes/min. and 1 flash/min/min respectively. Similarly for Huntsville, Ala., the delay in onset is 5–10 min, the lightning rate threshold is 5 flashes/min and the rate of increase in the lightning rate is 1 flash/min/min.

Once an alert is generated, this alert information (predicted location of the microburst/windshear) can be broadcast 624 to receivers which can then calculate and display the relative locations of the predicted microburst/windshear and the receiver.

Having shown the preferred embodiment, those skilled in the art will realize many variations are possible which will still be within the scope and spirit of the claimed invention. Therefore it is the intention to limit the invention only a indicated by the scope of the claims.

What is claimed is:

1. A system for predicting the occurrence of microburst/windshear comprising:
    a. one or more sensors responsive to signals from a thunderstorm to generate sensor signals;
    b. one or more data processors in communication with said sensors for processing the sensor signals to produce data;
    c. a warning device responsive to the data produced by one or more of said data processors for warning a user that a microburst/windshear will occur within a defined number of minutes at a location defined by the data, when the data indicate that the lightning rate exceeds a first threshold value, the time rate of lightning increase exceeds a second theshold value and there is a peak in the lightning rate.

2. The system of claim 1 wherein the sensors measure electrostatic potential.

3. The system of claim 1 wherein the sensors detect electromagnetic radiation from the lightning discharge.

4. The system of claim 3 wherein the sensors detect VHF radiation.

5. The system of claim 3 wherein the sensors detect UHF radiation.

6. The system of claim 3 wherein the sensors detect VLF radiation

7. The system of claim 3 wherein the sensors detect visible light radiation.

8. The system of claim 1 wherein the sensors are airborne.

9. The system of claim 1 wherein the system further comprises a communications link between said sensors and said data processors.

10. The system of claim 9 wherein said communications link is part of a radar transponder system.

11. The system of claim 9 wherein the communications link is a dedicated radio channel.

12. The system of claim 1 wherein the sensors are ground based.

13. The system of claim 1 wherein the signals from said thunderstorm are processed by one of said processors in communication with said sensors to generate data prior to said data being transmitted over said communications link to another of said processors which then processes the data to generate a warning.

14. A system for predicting the occurrence of microburst/windshear comprising:
    a. one or more sensors for receiving signals produced by lightning and generating sensor signals;
    b. one or more processors in communication with said sensors processors for processing said sensor signals and predicting the occurence of a microburst/windshear, said processor comprising
        i. a flash location device for determining the rate of lightning flashes, the change in the rate of lightning flashes and the position of the lightning flashes to define a center of activity;
        ii. a center of activity location device for determining the direction and speed of a center of activity as determined by the location of the lightning flashes and a wind vector associated with the thunderstorm;
        iii. a microburst/windshear analyzing device for predicting the occurence of a microburst/windshear by comparing the rate of lightning flashes and the change in the rate of lightning flashes with its respective threshold value, and searching for the occurence of a peak in the rate of lightning flashes; and
        iv. a warning device for warning a user of the impending occurence of a microburst/windshear, when the rate of lightning and the change in the lightning rate exceed its respective threshold and a peak in the lightning rate is detected within a center of activity.

15. A system for predicting the occurrence of microburst/windshear comprising:
    one or more sensors for receiving signals produced by lightning and generating a sensor signal;
    one or more processors in communication with said sensors for processing said sensor signals and predicting the occurrence of a microburst/windshear, said processor adapted to execute:
        i. an algorithm to determine the location of a lightning flash relative to a center of activity;
        ii. an algorithm to determine the location of the center of activity;
        iii. an algorithm to predict the direction and speed of the center of activity;
        iv. an algorithm to determine the rate of lightning flashes;
        v. an algorithm to determine the change in the rate of lightning flashes;

vi. an algorithm to predict the occurence of a microburst/windshear as determined by the rate, change in rate, and aerial density of lightning flashes; and vii. an algorithm for displaying the results of the calculations of the algorithm to display the microburst/windshear warning and the predicted location of the microburst/windshear.

16. A system for predicting the occurrence of microburst/windshear comprising:

at least one for receiving signals produced by lightning and producing sensor signals;

a processor incommunication with said sensor for processing said sensor signals and predicting the occurrence of a microburst/windshear, said processor comprising:

i. an apparatus to determine the location of a lightning flash relative to a center of activity;

ii. an apparatus to determine the location of a center of activity;

iii. an apparatus to determine the direction and speed of the center of activity;

iv. an apparatus to determine the rate of lightning flashes;

v. an apparatus to determine the change in the rate of lightning flashes;

vi. an apparatus to predict the occurence of a microburst/windshear as determined by the rate, change in rate, and position of lightning flashes; and vii. an apparatus for displaying the results of the calculations of the algorithm to display microburst/windshear warning and the predicted location of the microburst/windshear.

17. The system of claim 14, 15 or 16 wherein the location of said center of activity is defined by the location of a lightning centroid and the area of the center of activity is determined by the radius of a convective cell and the instrumental error associated in the determination of the location of lightning.

18. A method for predicting microburst/windshear hazard comprising the steps of:

receiving signals produced by lightning;

determining the location of the center of activity from said received signals;

determining the direction and speed of said center of activity;

determining the rate of lightning flashes;

determining the change in the rate of lightning flashes;

determining that a microburst/windshear is about to occur when the rate of lightning exceeds a first threshold value, and the change in the rate of lightning exceeds a second threshold value and a peak in the rate of lightning is measured within a given location as defined by the lightning flashes; and warning the user that a microburst/windshear will occur within a defined number of minutes.

* * * * *

UNITED STATES PATENT AND TRADEMARK OFFICE
CERTIFICATE OF CORRECTION

PATENT NO. : 4,996,473
DATED : February 26, 1991
INVENTOR(S) : Ralph J. Markson, et al It is certified that error appears in the above-indentified patent and that said Letters Patent is hereby corrected as shown below:

On title page, "Attorney, Agent, or Firm" should read --Weingarten, Schurgin, Gagnebin & Hayes--.

Column 4, line 47, "freguency" should read --frequency--.

Column 4, line 48, "freguency" should read --frequency--.

Column 6, line 52, "U.S. Pat. No. 4,801,940" should read --U.S. Pat. No. 4,801,942--.

Column 7, line 12, "routing" should read --routine--.

Column 7, line 42, "determing" should read --determine--.

Column 8, line 29, "defining" should read --define--.

Column 9, line 40, "only a indicated" should read --only as indicated--.

Signed and Sealed this

Twenty-sixth Day of July, 1994

Attest:

BRUCE LEHMAN

*Attesting Officer*     *Commissioner of Patents and Trademarks*